Patented Dec. 9, 1952

2,621,163

UNITED STATES PATENT OFFICE 2,621,163

PEST CONTROL COATING COMPOSITIONS

Conrad V. Coash, Chicago, Ill., assignor to The Sherwin-Williams Company, Cleveland, Ohio, a corporation of Ohio No Drawing. Application March 13, 1947, Serial No. 734,532

5 Claims. (Cl. 260—33.4)

This invention relates to clear coating compositions having pest control properties especially adapted for application to screens, grill-work, door and window sills, foundation ledges, and on other exterior and interior surfaces, whether the surfaces have previously been painted or not, for killing flies, ants and other pestiferous insects coming into contact with the surface of the applied coating.

Attempts have been made heretofore to provide satisfactory coating compositions having pest control properties. Such coating compositions have generally been one of two types, namely, solutions of contact insecticides in volatile non-film-forming carriers, or solutions of contact insecticides in pigmented coating compositions having relatively high non-volatile vehicle solids content and possessing film-forming characteristics comparable to commercially available paints and varnishes. The pest control agent most widely used in such compositions at the present time is dichloro-diphenyl-trichloroethane, hereafter referred to as DDT, although many others such as hexachlorocyclohexane, dichloro-diphenylethane, di(p-chlorophenyl)methyl carbinol, difluoro-diphenyl-trichloroethane and other proprietary products may be made a whole or a part of the active agent.

The first of the above mentioned types of coating compositions generally consisted merely of a solution of DDT in a solvent blend of a petroleum distillate such as kerosene containing a minor amount of an aromatic hydrocarbon such as xylene. The deposit formed by the application of such compositions comprises relatively large crystals of the pest control agent that adhere poorly to the coating surface, so that even slight disturbances from natural causes may dislodge considerable portions of the deposit. Any substantial jarring or shaking of the coated surface, such as is regularly imposed upon door screens, for example, may dislodge loosely adherent particles of the pest control agent deposited thereon and minimize the effective life of the coating. The large size of the crystals formed from solvent carriers reduces the efficiency of a given quantity of the pest control agent retained on coated surfaces. Also, because of the low viscosity of carriers of this type, only thin coatings can be applied, consequently a short insecticidally active film life can be anticipated from a single application and frequent coatings are necessary to maintain activity. Moreover, the resulting deposit lacks adherence and is removed by inadvertent contact, collects dust, and because of the larger crystals, greater discontinuity, and dust, is generally unsightly.

The second of the two types of compositions mentioned above contains relatively high solids contents apparently in order to provide durable films. The binder portion of the solids are usually good solvents for the insecticide. Thus, while a tenacious and durable film may be obtained which is not unsightly, most of the pest control agent remains dissolved in the binder portion of the film or crystallizes out in the interior of the film and is therefore isolated from contact with insects and reduced in effectiveness thereby. As a result, unnecessarily high concentrations of the pest control agent are indicated to produce effective deposits on selected surfaces. Another disadvantage of such compositions is that such a film is laborious to remove after it has lost its pest control properties, and successive applications over a period of time build up undesirable film thicknesses, fill the mesh of screens, require long drying periods, and are subject to the odors and other disadvantages of paints.

Films deposited from either of the above coating compositions, particularly those containing DDT, rapidly lose their toxicity to insects after prolonged exposure to strong sunlight. Thus, in order to obtain continuous protection against insects, successive applications of the compositions at frequent intervals are indicated, with obvious attendant disadvantages.

It is a general object of the present invention to provide an economical and efficient pest control coating composition that will form an adherent, dry, non-tacky film retaining toxicity to insects and other pests over prolonged periods of time.

Another object of the invention is to provide an insecticidal coating composition which will retain its lethal properties for a greater period of time than compositions heretofore proposed, in the presence of strong sunlight.

Still another object of the invention is to provide a coating composition which retains the active agent in a finer state of subdivision upon surfaces than active agents deposited from prior art compositions.

A further object of the invention is to provide a pest control coating composition having greatly improved application characteristics enabling it to be spread uniformly over most any surface with ease.

A further object of the invention is to provide a non-pigmented, pest control coating composition having a relatively high transparency so as to reduce its visibility after application to a minimum.

Still another object of the invention is to provide a film-forming insecticidal coating composition adapted to maintain a surface that is highly toxic to insects by a constant reinforcement of insecticidal ingredient at the surface through a slow migration of the active agent employed from the interior of the film to the air-film interface.

Still another object of the invention is to provide a film-forming insecticidal coating composition which retains the insecticidal agent employed therein with a practical firmness to the surface of the film in the form of minute crystals.

Still another object of the invention is to provide a quick drying insecticidal coating composition having the characteristics mentioned above, capable of forming a lasting, water insoluble film which may be removed with readily available solvents and provides a satisfactory base over which subsequent coats of the same composition or other protective and decorative coatings may be applied when one so wills.

Still other objects and advantages of the invention will become apparent from the following detailed description thereof and from the various examples of preferred compositions set forth.

An important feature of the invention that contributes to the accomplishment of the foregoing objectives is the tendency of the pest control agent employed to continue to migrate from the interior of the film to the air-film interface after the film has surface dried. The pest control agent initially produced on the surface of the film and reinforced by migration of the pest control agent from the body of the film is in the form of minute crystals or droplets that are quite uniformly and closely spaced over the entire surface thereof. As the surface deposit is held by the film-forming ingredients it is not worn or washed away by weathering, or dislodged by contact with other objects that may be brushed over the surface from time to time as readily as previously prepared pest control materials but is held to the surface where it sweats out in fine droplets in some cases and crystallizes in others.

A pest control coating composition embodying the invention and possessing the various advantages described above may comprise a suitable contact insecticide dissolved or dispersed in a liquid vehicle including a bodying agent which is also a film-forming material, and suitable volatile solvents with or without non-bodying film-forming resins. To such a composition minor quantities of other agents (e. g., driers, plasticizers) may be added, if desired, for modifying or improving the characteristics of the film, increasing the activity or broadening of the lethal effects of the insecticidal agent and prolonging its activity under normally destructive exposure conditions.

Of the contact insecticides that are suitable for use in carrying out the invention, DDT is the most satisfactory single insecticide. However, it is obvious that other compounds active as pest control compositions and soluble in paint and varnish solvents or other essentially hydrophobic solvents may be substituted in whole or in part for DDT with results that vary more or less according to the inherent pest control properties of the substituted materials and their behavior in the residual solid phase of the composition.

The film-forming constituent may comprise one or more amorphous substances commonly used in coating copositions which will provide a rapid drying protective film. Such film-forming constituents serve a manifold function: (1) a reservoir of lethal agent; (2) a control for film thickness of the applied coating; (3) a protective film; (4) an adhesive agent; and (5) an aid to easy application with a brush or spray. One of the principal advantages is the restoration and replenishment of the active ingredient at the air-film interface. In order that the pest control agent may migrate from the interior of the applied film to its surface in the manner indicated, the vehicle solids should preferably be a solvent for the pest control agent. It is also desirable that the solid portion of the vehicle or carrier be translucent, or substantially transparent, to avoid pronounced modification in appearance of surfaces over which the product is applied.

The bodying agent augments certain physical properties of the composition enabling the product to be applied in a reasonably thick film with an ordinary paint brush. While many bodying agents are effective as a minor part of the composition and can be employed for this purpose, it is desirable that the bodying agent be one which permits or facilitates the migration of the insecticidal agent from the interior of an applied film to the surface thereof, is reasonably free from gelation tendencies upon age in the package, and has no adverse effect upon the durability of the coating upon exposure to sunlight.

A wide variety of volatile solvents may be employed, many of the volatile solvents used in the varnish industry being satisfactory. An important consideration in addition to those encountered in the formulation of any film-forming coating composition is that the solvent or solvents be unreactive with the pest control agent employed.

The portion of the pest control composition which forms a film after evaporation of the solvent is an extremely important part of the composition.

For purposes of clarification, the film-forming components may be divided into three classifications. In many cases one component having film-forming qualities may serve a dual function and be of itself the efficient and sole film-forming agent, in most cases two are preferred.

For purposes of discussion of the film-forming component, the following differentiation is used. If one forms a 5% solution (1% might be sufficient) in the selected solvent of the film-forming agent and such product increases the viscosity of the resulting solution or dispersion more than 15% (said percentage determined from data taken by observing the viscosity of the solution with a No. 4 Ford cup at normal room temperatures of about 25° C.) said film-forming material will be classified as a bodying agent. If, however, the addition of 5% of the film-former increases the viscosity of the solvent less than 15%, that portion is hereinafter referred to as a non-bodying resin component.

Two types of bodying agents have been observed to have appreciable effect in minor concentrations upon the viscosity of the selected solvents and serve an important function as a part of the composition.

The most satisfactory bodying film-forming agents have been selected from that class of components characterized by elasticity and rubberiness. These materials are made by a variety of methods, for example, (1) by chemical reaction, (2) by polymerization or (3) by formulation. Their properties may be modified by suitable treatment such as vulcanization and/or formulation. Products of widely differing characteristics can be produced ranging from hard brittle substances to soft elastic masses. Examples of such compounds are styrene polymers, butylene polymers, the copolymers of butadiene with acrylonitrile, of butadiene and styrene, polymers of isoprene, polymers of isobutylene, copolymers of vinyl chloride and vinylidene chloride and of vinylidene chloride and acrylonitrile, polyvinyl alcohol, polyvinyl acetate, and polymers of, for example, chloroprene. (See also Condensed Chemical Dictionary, page 388, Reinhold Publishing Corporation.)

From the above broad class of such substances, it has been found that the polymers of, (1) styrene, (2) butylene, and (3) isobutylene are quite effective in endowing the product with the required viscosity to control the film thickness and otherwise influence the ease of application of the composition and are the preferred members of the broad classification. The bodying type substance is such that a relatively small portion (e. g., not more than about a 1:1 ratio by weight of the pest control agent) has the ability to increase the viscosity of the product when prepared ready for application to a viscosity of at least 11 seconds on a No. 4 Ford cup, and a preferred range of viscosity has been found to be from 12 to 16 seconds when measured by means of a No. 4 Ford cup.

While the following bodying agents are not preferred in the composition herein described, it has been found that one can substitute them for the bodying agents mentioned above, particularly if the composition is to be used immediately upon preparation. These bodying agents include metallic salts of high molecular weight organic acids, such as calcium, magnesium, zinc and aluminum salts of long chain fatty acids, and the same metallic salts of the complex naphthenic acids which are now available. A ready reference to materials of this type may be found in the Industrial Edition of Industrial and Engineering Chemistry for August 1946, pages 768–773.

From the previous description of the resin component it can be seen that the selected resin will exert little or no bodying action upon the composition. The resin functions to increase the durability of the film as an activator or synergist for the insecticidal material, and in conjunction with the film-forming bodying agent, functions as a reservoir for the lethal components. Among the resins that may be selected are the polyhydric alcohol esters of acidic resins such as ester gum, rosin-pentaerythritol esters, and maleic treated rosin esters. Oil soluble resins derived from the condensation of alkyl phenols and aldehydes and their modifications have been particularly acceptable. One essential characteristic of the phenol-aldehyde resin is its solubility in the solvent component. To assure a clear stable solution of the resin and a satisfactory film, it is suggested that the resin possess sufficient solubility in the solvent so that a stock 10% solution may be prepared and maintained.

As the solvent release from some resins is faster than in others, it is suggested that this factor also be considered, selecting from those resins found to have requisite durability, the one having fastest solvent release. Other oil soluble resins may be selected from those normally used in the paint and varnish industry, and from this large group many will be found that are satisfactory for specific applications. Phenolics are preferred because of the increased durability they impart to the insecticidally active films, and because some are transparent, clear and nearly water-white in grade.

Especially desirable results have been obtained with oil soluble catalyzed phenolic resins made by reacting substituted phenols (e. g., containing butyl, amyl, octyl, phenyl or other substituents tending to impart oil solubility) and formaldehyde, preferably in the ratio of about .7 to 1.1 moles of formaldehyde per mole of phenol. Diphene 13007 and Diphene 13005 (Sherwin-Williams) are specific illustrations of such resins.

Optimum biological activity and minimum visibility of the applied coating have been found to fall within a fairly critical ratio of film-forming component to active agent. If the ratio of film-former to agent is less than about 1:1.5 the film deposited is quite visible but so far as activity is concerned good results have been obtained at a ratio of 1:2. If the ratio is much above 2:1 a clear film is obtained having very poor to no effect upon the common pests against which the composition is intended. The quantity of the film-former should preferably be effective to form a film without a white appearance, large crystal formation of the active agent and discontinuity. On some surfaces, of course, a white appearance is immaterial, especially if the surface is white. The average crystal size of the active agent is preferably from about 0.1 to 0.5 mm.

The volatile essentially hydrophobic solvent or blend of solvents may be selected from among many active solvents for the components of this composition are not particularly critical and selection from among those commonly used in the paint, varnish and lacquer industry will facilitate availability.

The preferred solvents or blends possess a Kauri-Butanol number in excess of 75 and it is preferred to employ a single solvent or a blend of solvents possessing a Kauri-Butanol number in excess of 80. Solvent blends composed principally of distillates of petroleum in the kerosene range, for example, should have sufficient amounts of aromatic fractions added to increase the solvency to above 75 in order to maintain solution of all the ingredients at the low temperatures which may be anticipated in warehousing and storage of the composition.

While it may be apparent that a completely volatile solvent will have little or no effect upon the insecticidal activity of a dry film after the solvent has completely evaporated, results indicate that solvents retained in a DDT composition or film tend to give a faster knockdown than when the solvent has completely volatilized leaving totally dry films. There have been indications, however, that the durability of the film is impaired when solvents are retained, particularly when the boiling point range of the solvents selected are much above that of kerosene. In the latter cases early film failure upon exposure to ultraviolet light as from sunlight has been noted. It has also been found preferable in these compositions to employ solvents which evaporate completely from the film in less than a day's time, and to select from the more favorable resins those having a fast solvent release.

In some cases, a single solvent will be preferred, thus eliminating the necessity of solvent blending. Solvents prepared from reformate stocks or hydroformers made over processes developed for the manufacture of synthetic toluol containing as high as 96% of aromatics have been found very satisfactory as a single solvent portion. Thus, solvents containing a high percentage of aromatics, such as a product sold under the trade name of Solvesso No. 100, which allegedly contains in excess of 90% aromatics, has proven acceptable as a single solvent.

It has been observed that the faster the solvent release from the film the earlier the insecticidal activity of the coating becomes apparent. Crystallization, or "sweating" in some cases, on and from the film apparently starts after a preponderance of the volatile solvent has evaporated. One must use judgment in the choice of the solvent in order that the flash point is not so low as to constitute a dangerous fire hazard in the use of the product, and it is preferable that the flash point of the solvent or blend of solvents be held at a minimum of 100° F., although a higher flash point will increase the safety of the product. Volatile solvents having insecticidal qualities may be incorporated, but the value of such components after the film has dried is doubtful. Minor proportions of one or more of the many known insecticides having solvent properties may be added for their specific biological activity. Blends of vylene and deodorized kerosene are quite satisfactory, and while the percentage of aromatic may be varied, from 20 to 40% of the total solvent as aromatic indicates a practical range. The quantity of solvent is preferably in excess of 70% by weight of the composition.

While terms such as solvent and solution have been used herein to describe the action of the solvent or solvents on the non-volatile components it is to be understood that such terms are used in a broad sense and are intended to include dispersing and peptizing the non-volatile components as well as forming both colloidal and true solutions therewith.

One of the principal pest control agents employed in this composition is dichloro-diphenyl-trichloroethane or DDT. While DDT constitutes the basic insecticidally active agent of the composition herein described, it is well known that DDT does not have an active or immediate lethal effect upon all obnoxious household pests such as spiders and cockroaches and that other active agents may therefore be used in conjunction with the DDT, for example, di(p-chloro-phenyl) methyl carbinol, an arachnicide, may be a part of the biologically active component.

If the composition is specifically formulated as an arachinicide, the biologically active component may be entirely di(p-chlorophenyl)-methyl carbinol. Other specific biologically active compositions may also be substituted either wholly or partially one for the other, but the preferred active agents are those which will crystallize from solution, although other fluid materials such as, for example, a chlorinated hydrocarbon sold under the trade name of Velsicol 1068, empirically $C_{10}H_6Cl_8$ (an octachloro hexahydro-4,7-methanotetrahydroindene described in U. S. 2,519,190), will migrate or "sweat-out" from the herein described composition and extend the biological activity for a considerable period. While non-crystallizable active agents may be used, it is preferred that the major portion of the active component be a crystallizable component whereby activity is renewed through slow surface crystallization of the active agent from a solid solution in the film. In our preferred compositions, DDT is the principal active agent, while other specific lethal components may be selected to serve as a minor portion of the active component.

The percentage of the active agent present may be varied within a liberal range depending upon the solvent or blend of solvents used and the recommended directions and procedure for application of the composition. For example, it might be expedient in some instances to market a concentrated product, and as a separate item, a solvent blend for reduction of the concentrated product to a practical strength for application. Such compounds might be economically sound for purposes of shipping rates and freight classifications, for example, large scale industrial or agricultural needs may warrant specialized products. Experience has indicated that at the time of use and for direct application and normal usage, more than 6% of DDT in the composition has no advantages as far as lethal effect is concerned, although more may be utilized for other reasons.

As one increases the DDT content of the composition above 25% difficulties of solution in available and economic solvents multiply, and although there is no intent to limit the percentage of DDT employed in the composition, for all practical purposes 12% of DDT is the maximum necessary, and this latter amount will preferably be employed in specialized products designed for reduction on the job with suitable solvent blends as above indicated. Six per cent (6%) DDT has been found an optimum percentage as to durability upon prolonged exposure, and as to insecticidal activity, although a product may be formulated with lower percentages and exhibit biological activity.

Example I

A composition was prepared from the following ingredients:

6% DDT
3% Pliolite S-3
1% Diphene 13007
90% Solvesso 100

This composition was tested in the following manner: test cages were prepared with galvanized screen sides having a clean glass plate on the top and bottom unless otherwise specified. The three screened sides measured 4 inches wide and 2½ inches high. The screens were coated by dipping the screen strips in the material and then setting them on edge to dry on an absorbent surface to take up the run-off. Ten flies of uniform age were used in each cage for each test.

The ratings of efficiency of the various coatings were based on a 50% knockdown time using the following table:

1. Less than 18 minutes—Excellent
2. 18–30 minutes—Good
3. 31–60 minutes—Fair
4. 61–120 minutes—Poor
5. Over 120 minutes—Ineffective In some cases the time was also determined for an 80% knockdown.

The various film-forming compositions were also tested by aging in the shade and in the sunlight and in some cases in a National Carbon accelerated weathering unit. The National Carbon accelerated weathering unit is a well known instrument which gives a greatly accelerated test by subjecting films of the material to be tested to ultraviolet light with alternate subjections to spray and warm air 100% saturated at the temperature of the testing device. A very pronounced whitening effect upon aging was considered to be undesirable. This whitening effect was usually due to lack of a proper ratio of the ingredients in the composition.

Tests made with the composition of the present example showed a 50% knockdown in 18 minutes and an 80% knockdown in 22 minutes after 2 days which was therefore regarded as excellent. After 34 days there was a 50% knockdown in 27 minutes and 80% knockdown in 30 minutes which was good. After 3 days in an accelerated weathering unit there was a 50% knockdown in 28 minutes and 80% knockdown in 36 minutes which was also good. The film was slightly tacky and clear.

*Example II*

A composition was prepared as in Example I except that the ingredients consisted of:

6% DDT
3% Pliolite S-3
91% Solvesso 100

Results on the fly test described in Example I were excellent after 2 days, good after 6 days and good after 3 days in an accelerated weathering unit. The film was somewhat white and crystalline though not objectionably so for many uses. In this example it will be observed that there is a bodying agent but no resin in the composition.

*Example III*

O composition was prepared from the following ingredients:

6% DDT
4% Piccolastic FX
90% Solvesso 100

The fly tests of Example I were good after 1 day, excellent after 2 days, good after 11 days and excellent after 3 days in the weather test.

*Example IV*

A composition was prepared from the following ingredients:

6% DDT
1% Piccolastic powder
93% Solvesso 100

This composition when tested as in Example I for knockdown on flies was good after 1 day, excellent after 2 days, excellent after 15 days, good after 3 days in the weather test and excellent after 19 days for both 50% and 80% knockdown.

*Example V*

A composition was prepared from the following ingredients:

2% Pentalyn G
4% Polybutene (advance solvent)
6% DDT
29% xylene
59% mineral spirits This composition gave very good results as a screen coating material.

*Example VI*

A composition was prepared from the following ingredients:

6% Velsicol 1068 (1,2,4,5,6,7,8,8-octachloro-2,3,3a,4,7,7a-hexahydro-4,7-methanoindene
4% Pentalyn G
50% mineral spirits
2% Polybutene (elastomer from advance solvent)
38% xylene This composition illustrates a product containing a fluid insecticide. In this case Velsicol 1068, (1,2,4,5,6,7,8,8-octachloro-2,3,3a,4,7,7a-hexahydro-4,7-methanoindene) has been selected. It was found that the toxic effect in formulas of this nature was proportional to the active fluid insecticide within a range of about 2% to 10%. This example also illustrates a composition in which the active agent is a non-crystallizing material which "sweats out" of the film.

*Example VII*

A composition was prepared by mixing together the following ingredients:

25% DDT
5% Emulphor DDT (emulsifying agent)
5% Diphene 13007 (acid catalyzed phenolic resin)
65% Solvesso No. 100

This composition illustrates the preparation of a concentrate which is diluted with water prior to application to a concentration not more than about 5%-6% DDT.

*Example VIII*

A composition was prepared from the following ingredients:

6% di(p-chlorophenyl) methyl carbinol
2% Diphene 13007
2½% Pliolite S-3
89½% Solvesso No. 100

This composition illustrates the application of the invention to the preparation of an arachnicide.

*Example IX*

A composition was prepared from the following ingredients:

6% Penta chloro phenol
2% Diphene 13007
2½% Pliolite S-3
89½% Solvesso No. 100

This composition illustrates the preparation of a fungicidal material utilizing the principles of the invention.

*Example X*

A composition was prepared from the following ingredients:

6% DDT
6% Pliolite S-5
58.8% mineral spirits (petroleum distillate)
29.2% xylene This composition is another illustration of a composition similar to Example II in which the ratio of elastomer to active agent is approximately 1:1. This composition showed durability upon exposure.

*Example XI*

A composition was prepared by adding 4% Pyrin 20 to the composition of Example V to supplement the DDT.

*Example XII*

A composition was prepared from:

12% DDT
4% Diphene 13005
5% Pliolite S-3
79% xylene

The composition is a heavy concentrate which may be reduced with equal parts by weight of a suitable solvent such as mineral spirits prior to application. This example illustrates a practical maximum solids content.

In the foregoing examples, the compositions may be prepared by charging all of the ingredients into a mixing tank and agitating slowly until all the ingredients are dispersed or dissolved. However, as some ingredients are more difficult to disperse it is preferred to make stock concentrated solutions of the various film-forming ingredients and to prepare the composition from the base solutions by a simple blending operation.

In the examples Pliolite S-3 and S-5 are elastomers made by Goodyear which are high molecular weight copolymers of styrene and butadiene; Pliolite S-3 and S-5 contain approximately 15% butadiene and 85% styrene. Pliolite S-5 is further characterized by its solubility in aromatic hydrocarbons and its inertness to acids and alkalis. Piccolastic powder is a hydrocarbon resin formed by condensing styrene, substituted styrene and homologues thereof together. These resins are products of Standard Chemical Company of Akron, Ohio. Pentalyn G is a pentaerythritol ester of a rosin-maleic anhydride addition product. Polybutene is a high polymer of butylene. Pyrin 20 is a standardized solution of pyrethreum of 1% active pyrethrins. Other active ingredients which can be employed in making insecticidal compositions are: Thanite, a fluid isobornyl thiocyanoacetate; Hercules Toxaphene 3956, a terpene derivative; Dycoro, a DDT mother liquor from purification of DDT for aerosol grade and Rothane, dichloro diphenyl dichloroethane.

The solvent described as Solvesso No. 100 is a solvent containing about 96% aromatic compounds and boiling in the range of 310–365° F. Another solvent in a similar class is Shell TS28, with a boiling range from 318–400° F.

The preferred compositions of the invention when reduced and ready to apply do not contain more than 12% total solids of which about 1% to 6% is preferably the active ingredient and 1% to 6% is a film-forming ingredient. Of the 1% to 6% which forms a film-forming ingredient preferably not more than two-thirds (e. g., a ratio of resin to elastomer of 2:1) is a non-bodying film-forming ingredient such as a resin. These percentages are given on a weight basis of the total composition. It will be understood, of course, that concentrates can be prepared containing much higher proportions of active ingredients and film-forming ingredients and that these concentrates are to be diluted before use.

In the preparation of compositions in accordance with the invention, the active pest control ingredient, e. g., DDT, should be at least partially soluble in the bodying agent and in the non-bodying film-forming ingredients, thereby permitting the active agent to migrate through the film after the composition has been applied.

In the practice of the invention, excellent results have been obtained with compositions of the type herein described in the coating of screens wherein it is necessary for the composition to form a film on the individual wires of the screen without clogging the openings. It has been found that compositions containing bodying agents as herein described are exceptionally suitable for this purpose because when the film dries it will contract along the screen wires and will not clog the screen openings. Additionally, films produced in accordance with the invention exhibit excellent durability and good activity over substantial periods of time.

It may be noted that the compositions of the present invention are substantially non-pigmented and form transparent to translucent coatings. If a pigment were added to these compositions the proportions of the various ingredients would have to be entirely different to obtain compositions having suitable activity and other desirable characteristics. Thus, with compositions of the present invention the ratio of non-volatile film-forming portion of the vehicle to active ingredient does not ordinarily exceed 1.5 to 1 and is preferably around 1:1 whereas if a pigment is present from say 2 to 10 parts requires about 3 parts of the non-volatile film-forming portion of the vehicle to 1 part of active ingredient. This increases the cost of the composition and interferes with its application for many purposes such as screen coating and in other cases, where it is desired to apply the composition without clogging the pores of a porous surface or alter the color and appearance of the surface over which it is applied.

The term "pest control agent" is herein employed in a popular rather than a scientific sense, for the compound used may be aimed at spiders and flies as well as moths, moth larvae and wood lice. It has not been deemed necessary to properly classify the common household pestiferous "insects" strictly according to scientific terms. The term "pest control agents" is used generically to cover agents which will kill wood lice which may be crustacae, spiders which are arachnae and house flies which are true insects, parasites, fungus, moths, etc., it being understood, however, that a given pest control agent may not be effective against all pests.

Having thus described the invention, what I claim as new and desire to secure by Letters Patent of the United States is:

1. A pest lethal coating composition consisting essentially of from 1 to 6 per cent of a pest toxic agent, from 1 to 6 per cent of a solid amorphous binder in which said toxicant is soluble, and a volatile hydrocarbon mutual solvent therefor, a part of said binder being a styrene-butadiene copolymer in an amount sufficient to increase the viscosity of said composition and the remainder of said binder being an oil soluble acid catalyzed alkyl phenol formaldehyde resin in which the molar ratio of alkyl phenol to formaldehyde is within the range from 1:0.7 to 1:1.1, the weight ratio of total binder to said agent being not more than 2:1 and said solvent being in excess of 70 per cent by weight of the total composition and being characterized by a kauri-butanol value above 75.

2. A pest lethal coating composition comprising 1 to 6 per cent of dichloro diphenyl trichloroethane, from 1 to 6 per cent of a solid amorphous binder in which said dichloro diphenyl trichloroethane is soluble, and a volatile hydrocarbon mutual solvent therefor, at least a part of said binder being a styrene-butadiene copolymer in an amount sufficient to increase the viscosity of said composition and another part being a non-bodying oil soluble acid catalyzed alkyl phenol aldehyde resin in which the molar ratio of alkyl phenol to formaldehyde is within the range of from 1:0.7 to 1:1.1, the weight ratio of total binder to dichloro diphenyl trichloroethane being within the range of 1:2 to 2:1, and said solvent being present in excess of 70 per cent by weight of the total composition and being characterized by a kauri-butanol value above 75.

3. A pest lethal coating composition comprising 1 to 6 per cent of di(para-chlorophenyl)-methyl carbinol, from 1 to 6 per cent of a solid amorphous binder in which said di(para-chlorophenyl)methyl carbinol is soluble, and a volatile hydrocarbon mutual solvent therefor, at least a part of said binder being a styrene-butadiene polymer in an amount sufficient to increase the viscosity of said composition and another part being a non-bodying oil soluble acid catalyzed alkyl phenol formaldehyde resin in which the molar ratio of alkyl phenol to formaldehyde is within the range of from 1:0.7 to 1:1.1, the weight ratio of total binder to di(para-chlorophenyl)methyl carbinol being within the range of 1:2 to 2:1, and said solvent being present in excess of 70% by weight of the total composition and being characterized by a kauri-butanol value above 75.

4. A pest lethal coating composition comprising 1 to 6 per cent of 1,2,4,5,6,7,8,8-octachloro-2,3,3a,4,7,7a-hexahydro-4,7-methanoindene, from 1 to 6 per cent of a solid amorphous binder in which said methanoindene is soluble, and a volatile hydrocarbon mutual solvent therefor, at least a part of said binder being a styrene-butadiene copolymer in an amount sufficient to increase the viscosity of said composition and another part being a non-bodying oil soluble acid catalyzed alkyl phenol aldehyde resin in which the molar ratio of alkyl phenol to formaldehyde is within the range of from 1:0.7 to 1:1.1, the weight ratio of total binder to said methanoindene being within the range of 1:2 to 2:1, and said solvent being present in excess of 70 per cent by weight of the total composition and being characterized by a kauri-butanol value above 75.

5. A pest lethal coating composition comprising 1 to 6 per cent of pentachlorophenol, from 1 to 6 per cent of a solid amorphous binder in which said pentachlorophenol is soluble, and a volatile hydrocarbon mutual solvent therefor, at least a part of said binder being a styrene-butadiene copolymer in an amount sufficient to increase the viscosity of said composition and another part being a non-bodying oil soluble acid catalyzed alkyl phenol aldehyde resin in which the molar ratio of alkyl phenol to formaldehyde is within the range of from 1:0.7 to 1:1.1, the weight ratio of total binder to pentachlorophenol being within the range of 1:2 to 2:1, and said solvent being present in excess of 70 per cent by weight of the total composition and being characterized by a kauri-butanol value above 75.

CONRAD V. COASH.

REFERENCES CITED

The following references are of record in the file of this patent:

UNITED STATES PATENTS

| Number | Name | Date |
|---|---|---|
| 2,293,413 | Stoner | Aug. 18, 1942 |
| 2,380,456 | Maier | July 31, 1945 |
| 2,389,229 | Young | Nov. 12, 1945 |
| 2,398,069 | Young | Apr. 9, 1946 |
| 2,458,639 | Quarles | Jan. 11, 1949 |
| 2,460,376 | Caprio | Feb. 1, 1949 |
| 2,477,316 | Sparks | July 26, 1949 |
| 2,497,294 | Cartwright | Feb. 14, 1950 |

FOREIGN PATENTS

| Number | Country | Date |
|---|---|---|
| 578,206 | Great Britain | June 19, 1946 |

OTHER REFERENCES

Hayhurst, "Action on Certain Insects of Fabrics Impregnated with DDT." J. Soc. Chem. Ind., October 1945, page 296.

Knipling, Soap and Sanitary Chemicals, July 1947, p. 127 (col. 3 under "chlordane").

Roark, "A Digest of Information on Chlordane," U. S. Department of Agriculture, Bureau of Entomology and Plant Quarantine, April 1951, Bulletin E-817, pp. 4, 5, 9.

Carrick, "The Use of D. D. T. in Paint," 5 page reprint from October 31, 1945, issue of American Paint Journal Convention-At-Home Daily.

Aiken, Modern Plastics, February 1947, pp. 100–102.

Neville, Resins and Plasticizer, pp. 50–58, published 1945 by Neville Co., Pittsburgh.

Piccolastic, 16 page pamphlet published by Standard Chemical Co., Akron, Ohio, received in Patent Office July 22, 1946.